United States Patent [19]

Gaiffi et al.

[11] 4,087,291

[45] May 2, 1978

[54] CERIUM MISCH-METAL/COBALT MAGNETS

[75] Inventors: Sevi Gaiffi; Anton Menth, both of Nussbaumen; Hartmut Nagel, Baden, all of Switzerland

[73] Assignee: BBC Brown, Boveri & Company, Limited, Baden, Switzerland

[21] Appl. No.: 808,135

[22] Filed: Jun. 17, 1977

Related U.S. Application Data

[63] Continuation of Ser. No. 603,726, Aug. 11, 1975, abandoned.

[30] Foreign Application Priority Data

Aug. 13, 1974 Switzerland ........................ 11025/74

[51] Int. Cl.[2] .......................... H01F 1/02; C04B 35/00

[52] U.S. Cl. .................................... 148/31.57; 75/152; 148/101; 148/103; 148/105; 148/108

[58] Field of Search ............... 148/101, 102, 103, 105, 148/108, 31.57; 75/152

[56] References Cited

U.S. PATENT DOCUMENTS

| | | | |
|---|---|---|---|
| 3,682,716 | 8/1972 | Martin et al. | 148/31.57 |
| 3,873,379 | 3/1975 | Yamanaka et al. | 148/103 |
| 3,919,001 | 11/1975 | Ratnam | 148/31.57 |
| 3,947,295 | 3/1976 | Tawara et al. | 148/31.57 |
| 4,003,767 | 1/1977 | Bachmann et al. | 148/105 |

OTHER PUBLICATIONS

Strnat, K.; Cobalt-Rare Earth. . . Permanent Magnet Materials, in Cobalt , 36, Sep., 1967, pp. 133-143.

*Primary Examiner*—Walter R. Satterfield
*Attorney, Agent, or Firm*—Oblon, Fisher, Spivak, McClelland & Maier

[57] ABSTRACT

A permanent magnetic material, predominantly containing cerium misch-metal (CeMM) and cobalt, characterized by the composition:

$(CeMM_{1-x}RE_x)_{1-y}Sm_yCo_{5\pm0.2}$ wherein $0<x<0.5;\ 0\leq y\leq 0.25,$

RE comprises at least one of the rare earths, cerium, lanthanum, neodymium and praseodymium, and the cerium misch-metal approximately possesses the composition $Ce_\delta La_\beta Nd_\gamma Pr_\delta,$ wherein $0.45<\alpha<0.55$
$0.20<\beta<0.40$
$0.05<\gamma<0.15$
$0.00<\delta<0.05$ and $\alpha+\beta+\gamma+\delta\simeq 1.$

20 Claims, 7 Drawing Figures

CERIUM MISCH-METAL/COBALT MAGNETS

This is a continuation, of application Ser. No. 603,726, filed Aug. 11, 1975 now abandoned.

BACKGROUND OF THE INVENTION

1. Field of the Invention:

The present invention relates to permanent magnetic material, predominantly containing cerium misch-metal (CeMM) and cobalt and to a process for the production of the same.

2. Description of the Prior Art:

This type of material has already been variously described in the literature. For example, D. V. Ratnam and M. G. H. Wells, (AIP Conf. Proc. 18, American Institute of Physics, New York 1974) have reported the properties of certain misch-metal/cobalt magnets. They disclosed individual magnets with energy products of up to 15 MGOe and coercive fields of up to 14 KOe. However, these magnets show demagnetizing curves of only moderately pronounced rectangular shape.

Cerium misch-metal is the term used for the light rare earths, separated from ores. For example, B. V. Kleber and B. Love (Technology of Scandium, Yttrium and the Rare Earth Metals, Pergamon Press, New York 1963, p. 10), report that Bastnaesite and Monazite, respectively, show the following percentage contents of rare earths:

| | Bastnaesite | Monazite |
|---|---|---|
| La | 30 | 38 |
| Ce | 50 | 48.5 |
| Pr | 4 | 3.6 |
| Nd | 14 | 8.8 |
| Sm | 1 | 0.5 |

As can be seen, the composition of cerium misch-metal is not constant but fluctuates according to the starting ore. For the most important constituents, cerium, lanthanum, neodymium and praseodymium, the contents generally fluctuate at least between 45 and 55, 20 and 40, 5 and 14, and 0 and 5 atom-percent, respectively. Thus, it is certainly not surprising that it is difficult to produce magnets containing cerium misch-metal such as samarium magnets with a cerium misch-metal additive, which have satisfactory properties with reproducible values from magnet to magnet.

SUMMARY OF THE INVENTION

Accordingly, it is an object of this invention to provide a permanent magnetic material containing cerium misch-metal, which not only possesses energy products of about 16 MGOe and coercive field strengths of above 8 KOe and is characterized by a rectangular demagnetizing curve, but, in addition, can also be economically produced in a repeatable fashion.

It is another object of this invention to provide a process for producing such a permanent magnetic material.

Briefly, these and other objects of this invention, as will hereinafter become clear by the ensuing discussion, have been attained by providing a material which is characterized by the composition $$(CeMM_{1-x}RE_x)_{1-y}Sm_yCo_{5\pm0.2},$$

where $0<x<0.5$; $0\leqq y\leqq 0.25$ and preferably $x$ is 0.05 to 0.50 and $y$ is 0 to 0.25; RE comprises at least one of the rare earths; cerium, lanthanum, neodymium and praseodymium. The cerium misch-metal indicated as CeMM, approximately possesses the composition $Ce_\alpha La_\beta Nd_\gamma Pr_\delta$, where $0.45<\alpha<0.55$, preferably 0.50 to 0.55 and most preferably 0.54, $0.20<\beta<0.40$, preferably 0.30 to 0.35 and most preferably 0.32; $0.05<\gamma\lambda<0.15$, preferably 0.10 to 0.15 and most preferably 0.12; $0.00<\delta<0.05$, preferably 0.03 to 0.05 and most preferably 0.04; and $\alpha+\beta+\gamma+\delta\simeq 1$.

BRIEF DESCRIPTION OF THE DRAWINGS

A more complete appreciation of the invention and many of the attendant advantages thereof will be readily attained as the same becomes better understood by reference to the following detailed description when considered in connection with the accompanying Drawings, wherein.

DESCRIPTION OF THE PREFERRED EMBODIMENTS

Figure 3:
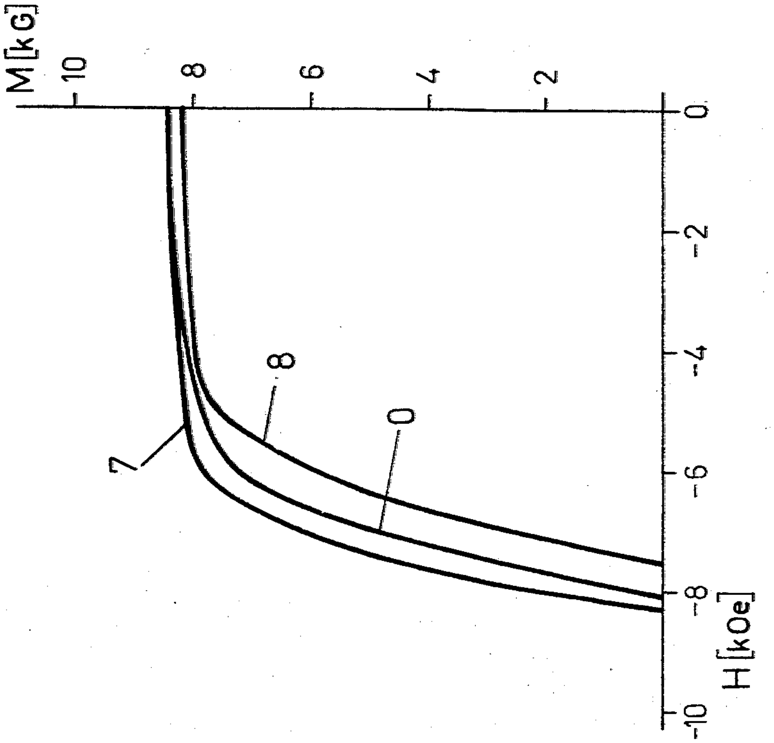
FIG. 3 shows the demagnetizing curves of permanent magnetic material containing alloys of the composition $CeMM_{1-x}Pr_xCo_5$, 0, 7 and 8 denoting alloys with an excess content x of praseodymium of 0; 0.05 and 0.1.

These alloys are produced by introducing the starting alloy and, optionally, a sintering additive, both in coarsely disintegrated form, into a mill, grinding the mixture under a protective gas, to a powder of a few μm particle size, preferably from 1 to 10 μm, aligning it in a magnetic field at about 50 KOe, compressing it isostatically into a pressed body, sintering it between 1035° and 1045° C and submitting it to heat-treatment above 300° C. The heat-treatment can advantageously take place in one of two ways; on the one hand, by annealing the permanent magnetic material between 950° and 1020° C, preferably 980 ± 10° C, for 6 – 50 hours and preferably 10 hours, rapidly cooling it immediately afterwards and subsequently tempering it between 300° and 600° C, preferably about 350° C, for 30 – 60 minutes, preferably 30 – 40 minutes. On the other hand, it is also possible to pass the permanent magnetic material, after annealing, into a zone of lower temperature of about 250° to 300° C, preferably about 300° C, and to cool it to room temperature within 5 minutes to 1 hour, preferably about 15 minutes. Magnetic materials produced in this way, without exception, are distinguished by high energy products, high coercive field strengths and almost rectangular demagnetizing curves. Materials containing cerium misch-metal/cobalt especially possess surprising improvements in their coercive field strength. Materials with an excess content of neodymium, preferably lying between 0 and 45 atom-percent, furthermore also possess improved remanence. The materials can be sintered from the starting alloys in a protective gas atmosphere, e.g., under helium or argon. It is advisable to use a sintering additive, which is mixed with the starting alloy. A suitable sintering additive is an alloy containing 50 to 70 percent by weight, preferably about 60 %, of rare earth metal, particularly Ce, La, Nd, Pr or Sm, and 30 to 50 percent by weight, preferably about 40%, of cobalt, which can represent about 10 - 14 percent by weight of the total weight of the mixture. It is of particular advantage, in this case, to grind the mixture consisting of sintering additive and starting alloy in coarsely disintegrated form, in a reverse jet mill.

EXAMPLES

The following description of tests, experiments, and sample compositions are provided for purposes of illustration only and are not intended to be limiting unless otherwise specified.

The starting substances used for the production of the permanent magnetic materials were cerium misch-metal, the composition of which was determined to an accuracy of about 1 % with the aid of an X-ray fluorescence spectrometer which showed 53.7 percent by weight of cerium, 30.2 percent by weight of lanthanum, 12.0 percent by weight of neodymium and 4.0 percent by weight of praseodymium, Sm, Ce, La, Nd and Pr, all of 99.9 % purity, as well as 99.99 % pure cobalt. All the alloys were melted in batches of 120 g, each in a boron nitride crucible, under a protective gas atmosphere of argon, in a medium frequency furnace at about 1200° C. The molten brittle alloys then were crushed into particles with diameters of less than 0.5 mm and subsequently ground in a reverse jet mill into a powder with a particle size of between 2.5 and 4 μm. The powders were pressed at moderate pressure into cylindrical test bodies, aligned in a magnetic field of about 50 KOe, isostatically compressed at 600 atmospheres and subsequently sintered for at least half an hour between 1035° and 104[illegible] C. By means of a subsequent heat-treatment, as hereinafter described, the magnetic properties of the materials produced could be considerably improved still further.

Before the sintering operation, sintering additives, made from an alloy containing 60 percent by weight Sm and 40 percent by weight of cobalt (Sm 60 - Co 40 sintering additive) were added to the ground starting alloys. The weight of this sintering additive varied between 10 and 14 % of the total weight of the pressed body to be sintered. For certain suitable starting alloys, when sintering in an oxygen-free atmosphere, however, it is also conceivable to produce magnets without a sintering additive. Apart from the Sm/Co alloys, other light rare earths, in the form of an RE 60 - Co 40 alloy (where RE = Ce, La, Pr or Nd) are also suitable as a sintering additive.

Pulverized starting alloys different from those above prepared by fusion from the elements, were produced by mixing of disintegrated CeMM $Co_5$-alloys and RE-$Co_5$-alloys and subsequent combined milling. Correspondingly, disintegrated sintering additives were added to the disintegrated starting alloys and this mixture was ground into a powder in a counter-current mill. From the molten 4-alloy series, $CeMM_{1-x}Ce_xCo_5$, $CeMM_{1-x}La_xCo_5$, $CeMM_{1-x}Pr_xCo_5$ and $CeMM_{1-x}Nd_x$-$Co_5$, permanent magnetic materials of the composition $(CeMM_{1-x}RE_x)_{1-y}Sm_yCo_{5\pm0.2}$ were produced in this way. RE = Ce, La, Nd or Pr; $O<x<0.5$ and $0\leqq y\leqq0.25$. The demagnetizing curves of these materials were recorded with a vibration magnetometer at a maximum field strength of 50 KOe.

The measured results of some representative materials are summarized in the table and in FIGS. 1 - 5.

TABLE

Composition of the molten alloys and the hard-magnetic data for permanent magnetic material produced using a Sm 60-Co 40 sintering additive

| Molten alloy | Composition of molten alloy (atom-percent) Ce | La | Na | Pr | $B_R$ [KG] | ${}_IH_C$ [KOe] | (BxH) max. [MGOe] |
|---|---|---|---|---|---|---|---|
| 1 | 53.7 | 30.2 | 12.0 | 4.0 | 8.1 | 7.4 | 15.5 |
| 2 | 60.7 | 25.6 | 10.2 | 3.4 | 8.0 | 8.1 | 15.0 |
| 3 | 67.6 | 21.1 | 8.4 | 2.8 | 7.7 | 6.2 | 14.3 |
| 4 | 48.3 | 37.2 | 10.8 | 3.6 | 8.1 | 8.3 | 15.8 |
| 5 | 43.0 | 44.2 | 9.6 | 3.2 | 8.05 | 10.0 | 14.7 |
| 6 | 37.6 | 51.1 | 8.4 | 2.8 | 7.95 | 12.7 | 15.1 |
| 7 | 51.0 | 28.7 | 11.4 | 8.8 | 8.35 | 8.2 | 16.0 |
| 8 | 48.3 | 27.2 | 10.8 | 13.6 | 8.1 | 7.5 | 15.0 |
| 9 | 51.0 | 28.7 | 16.4 | 3.8 | 7.85 | 16.5 | 14.8 |
| 10 | 48.3 | 27.2 | 20.8 | 3.6 | 8.15 | 16.1 | 16.1 |
| 11 | 43.0 | 24.2 | 29.6 | 3.2 | 8.10 | 13.2 | 15.8 |
| 12 | 37.6 | 21.1 | 38.4 | 2.8 | 8.05 | 12.85 | 15.2 |
| 13 | 26.0 | 15.1 | 56.0 | 2.0 | 8.9 | 4.7 | 16.2 |

The alloys 1 - 13 can also be represented by the formulae below for CeMM = $Ce_{0.537}La_{0.302}Nd_{0.120}Pr_{0.04}$:

(a) Alloys 1 - 3
$(CeMM)_{1-x}Ce_xCo_5$, where $x$ = 0; 0.15 and 0.30;

(b) Alloys 4 - 6
$(CeMM)_{1-x}La_xCo_5$, where $x$ = 0.10; 0.20 and 0.30;

(c) Alloys 7 - 8
$(CeMM)_{1-x}Pr_xCo_5$, where $x$ = 0.05 and 0.10; and (d) Alloys 9 - 13
$(CeMM)_{1-x}Nd_xCo_5$, where $x$ = 0.05; 0.10; 0.15; 0.30 and 0.50.

Figure 1:
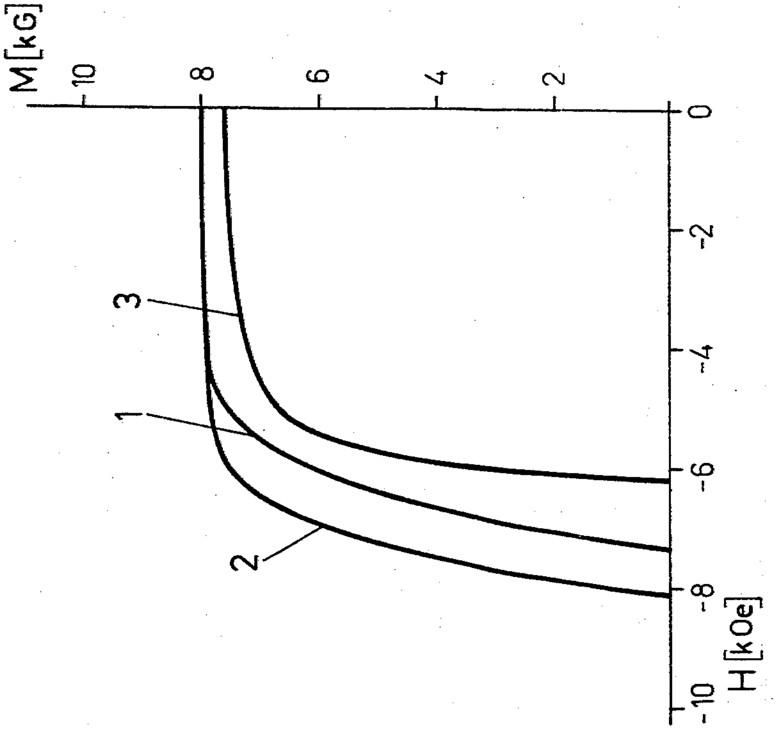
FIG. 1 shows the demagnetizing curves of permanent magnetic material containing alloys of the composition $CeMM_{1-x}Ce_xCo_5$, 1, 2 and 3 denoting alloys with an excess content x of cerium of 0, 0.15 and 0.30.

Using the measurements performed on the permanent magnetic materials which were produced from the alloys 1, 2 and 3, the effect of an increase of the cerium content in the cerium misch-metal can be seen from an inspection of the Table and FIG. 1. First, a rise in the coercive field strength occurs with increase in Ce content (Alloy 2 with an additional cerium content of $x$ - 0.15) in contrast with Alloy 1. However, with further increasing cerium content, a deterioration of the coercive field strength as well as of remanence and of the rectangular shape of the MH-curve occurs. Accordingly, an examination of the Table reveals that a content of approximately 0.55 to 0.65 atom-percent of cerium in the cerium misch-metal, corresponding to x-values in the formula representation $(CeMM)_{1-x}Ce_xCo_5$ of between 0.05 and 0.25, has a favorable influence on the magnetic properties of the alloys of this invention. Permanent magnetic material of the composition $(CeMM_{1-x}Ce_x)_{1-y}Sm_yCo_5$, where $0.05<x<0.25$ and $0\leqq y\leqq0.25$, therefore possesses surprisingly good magnetic properties.

Figure 2:
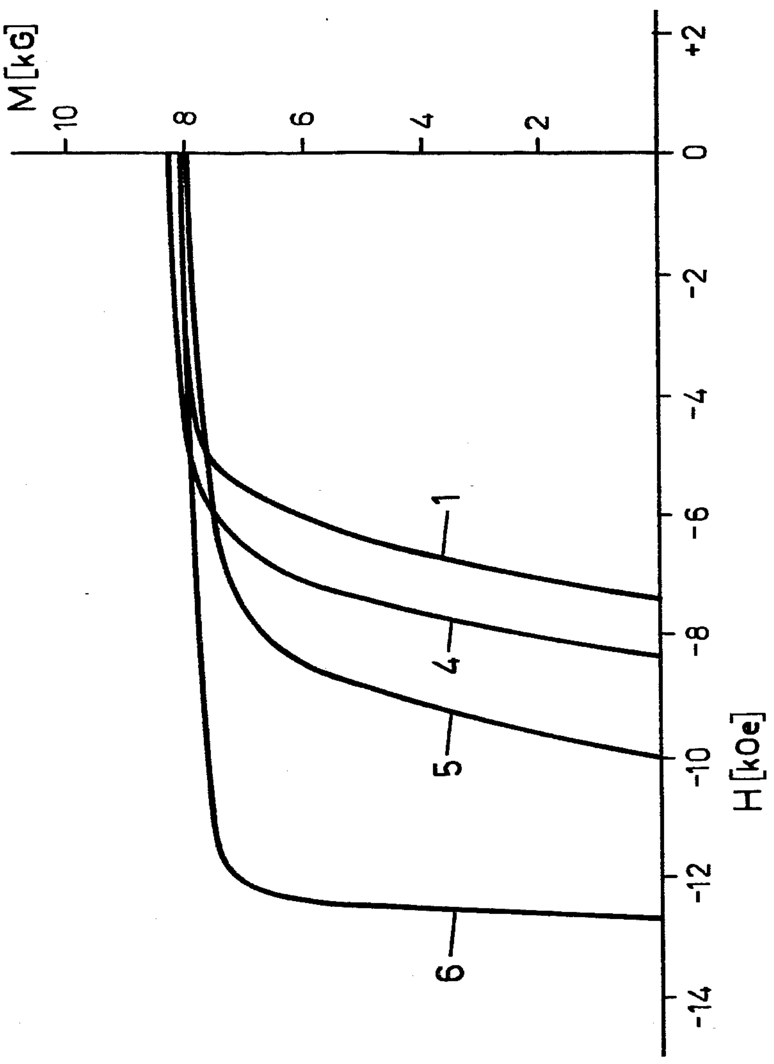
FIG. 2 shows the demagnetizing curves of permanent magnetic material containing alloys of the composition $CeMM_{1-x}La_xCo_5$, 1, 4,5 and 6 denoting alloys with an excess content $x$ of lanthanum of 0, 0.1; 0.2 and 0.3.
Figure 4:
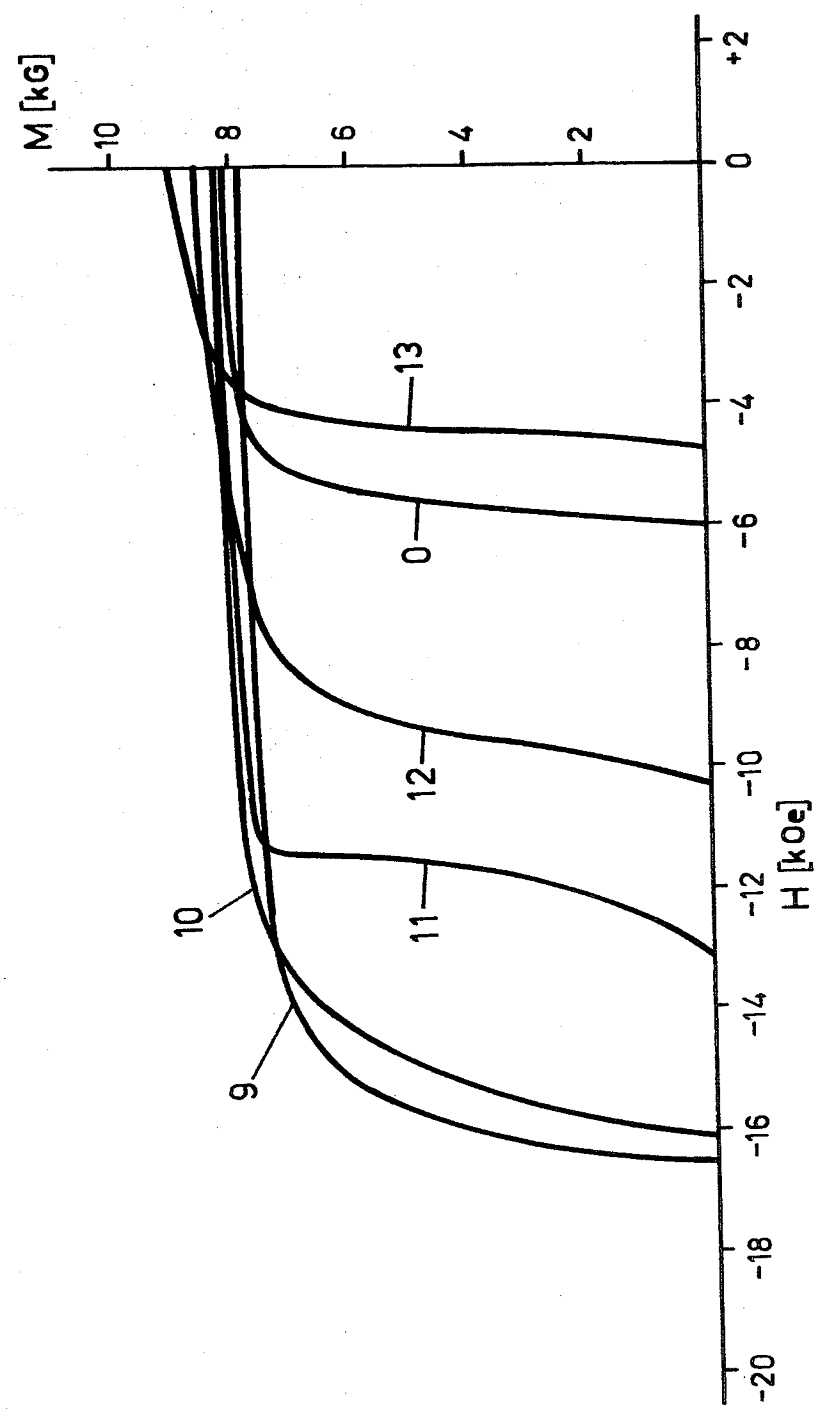
FIG. 4 shows the demagnetizing curve of permanent magnetic material, containing alloys of the composition $CeMM_{1-x}Nd\ Co_5$, 0, 9, 10, 11, 12, and 13 denoting alloys with an excess content x of neodymium of 0; 0.25; 0.1; 0.15; 0.3 and 0.5.
Figure 5:
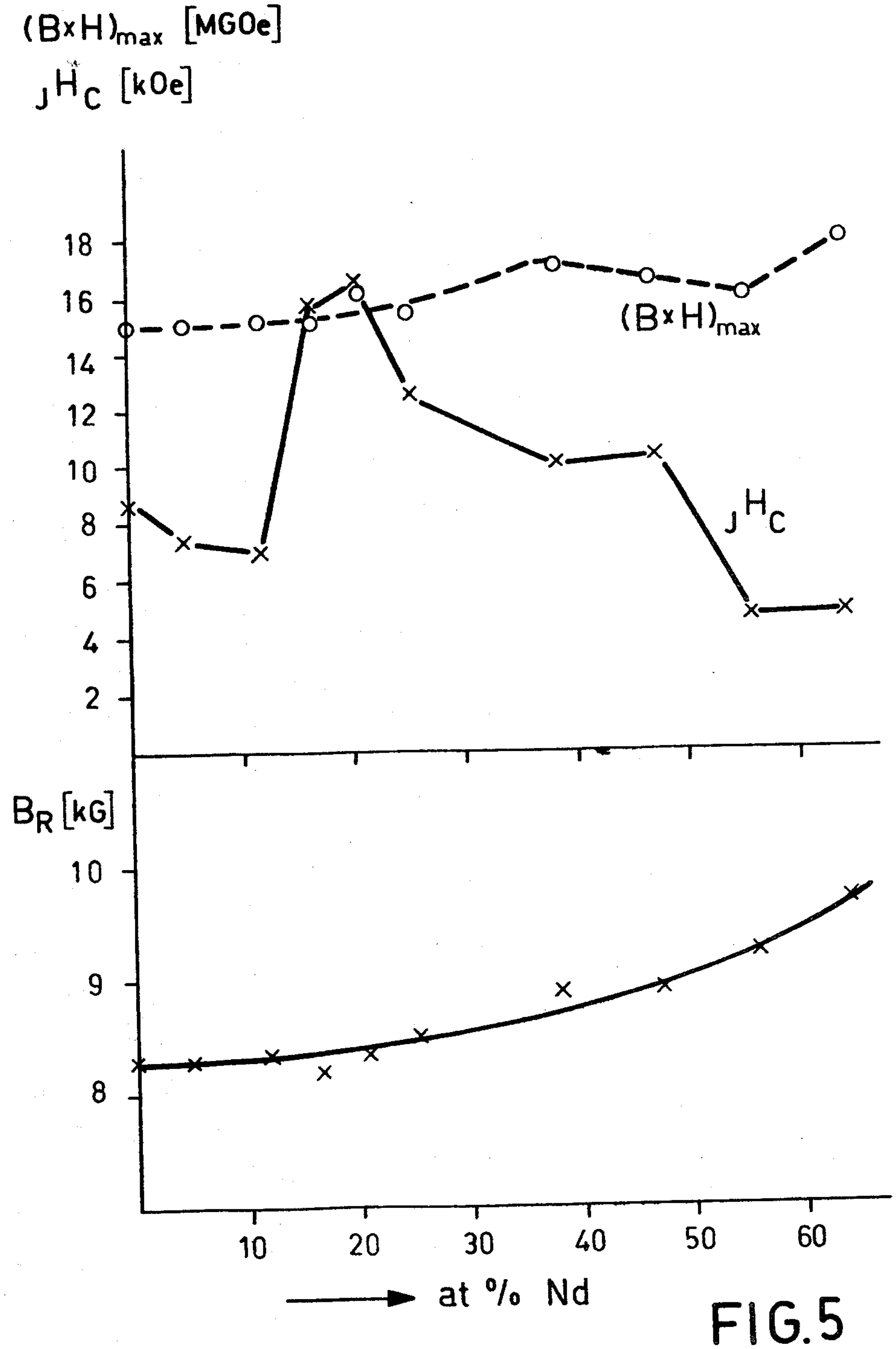
FIG. 5 shows the coercive field strength $_JH_C$ and the remanence $B_R$ of permanent magnetic material, containing cerium misch-metal/cobalt, as a function of the neodymium content of the rare earths.

It can be inferred from the Table, (Alloys 1, 4, 5 and 6), and from FIG. 2 that an increase in the lanthanum content results in a rise in the coercive field strength from ${}_IH_C$ = 7.4 KOe for a cerium misch-metal alloy without additional lanthanum content (Alloy 1), to ${}_IH_C$ = 12.7 KOe for a total lanthanum content of 51.1 atom-percent. The magnetic remanence $B_R$ remains unchanged within the limits of measuring accuracy. Similarly, the rectangular shape of the magnetizing curve and the energy product $(BH)_{max}$ remain essentially unchanged. It may be definitely concluded from this that a lanthanum content of from 0.40 to 0.65, corresponding to x-values in the formula representation $(CeMM)_{1-x}La_xCo_5$ of between 0.15 and 0.50, causes a considerable improvement in the coercive field strength.

According to the Table (Alloys 1, 7 and 8) and FIG. 3 (where Alloy 1 is denoted by "0"), an increase in the praseodymium content of 5 to 10 atom-percent, corresponding to x-values in the formula representation $(CeMM)_{1-x}Pr_xCo_5$ of between 0.03 and 0.06, has a positive influence on the magnetic properties. As can be seen from the Table (Alloys 1, 9 - 13) and FIG. 4 (where Alloy 1 is denoted by "0"), an increase in the neodymium content causes the most marked rise in the coercive field strength. The increase from 12 atom-percent in the cerium/misch-metal alloy 1 having no additional neodymium content, to, for example, 20.8 atom-percent in the alloy 10, raises the ${}_IH_C$-value from 7.4 KOe to 16.1 KOe as well as raising the remanence. However, on raising the neodymium content to above 45 atom-percent (Alloy 12), the coercive field strength ${}_IH_C$ visibly deteriorates and, at 56.0 atom-percent, reaches values of not more than 4.7 KOe. Yet, at this composition, the remanence value is 8.9 KG. An improvement of the magnetic properties of cerium misch-metal/cobalt alloys therefore occurs, as can be seen especially from FIG. 5, approximately at a neodymium content of from 12 to 50 atom-percent, corresponding to x-values in the formula representation $(CeMM)_{1-x}Nd_xCo_5$ of between 0 and 0.45.

Figure 6:
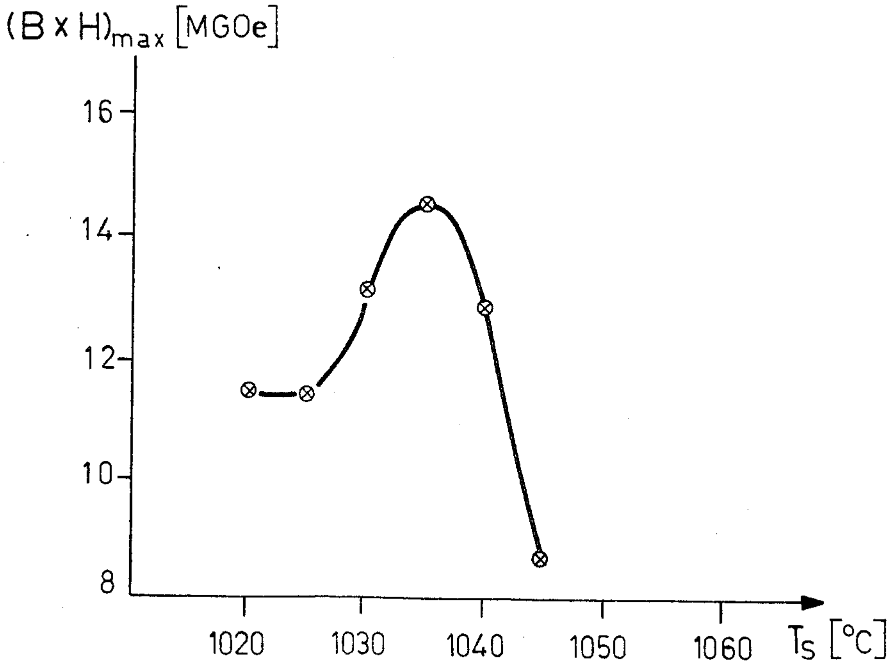
FIG. 6 shows the energy product $(BH)_{max}$ of a CeMM-containing alloy, as a function of the sintering temperature $T_s$.

The alloys of this invention, as well as all other $RE\text{-}Co_5$-containing, especially CeMM-containing, permanent magnetic materials can be further improved quite considerably in their magnetic properties by sintering at an appropriate temperature and by an appropriate subsequent heat-treatment. The optimum sintering temperature was determined for a $CeMMCo_5$-magnet. The magnet was produced by using 8 - 16 percent by weight of a sintering additive, containing 60 percent by weight Sm and 40 percent by weight Co. Using conventional methods, the $CeMMCo_5$ and the Sm 60- Co 40 alloys were separated, milled in a reverse jet mill, mixed for ½ hour, aligned in a magnetic field at 50 KOe and isostatically pressed at a pressure of 100 atmospheres. For mixtures with 8, 10, 14 and 16 percent by weight, test samples were sintered at various temperatures within the range of 1015° C<$T_s$<1055° C. It was shown that the density and the remanence $B_R$ continuously increased with increasing sintering temperature. The energy product, however, according to FIG. 6, showed a pronounced maximum which, with increasing quantity of sintering additive, shifts toward lower values and, as a first approximation, corresponds to the optimum sintering temperature. This series of experiments showed that sintering temperatures of between 1035° C and 1045° C are to be preferred for all cobalt magnets containing cerium misch-metal.

Figure 7:
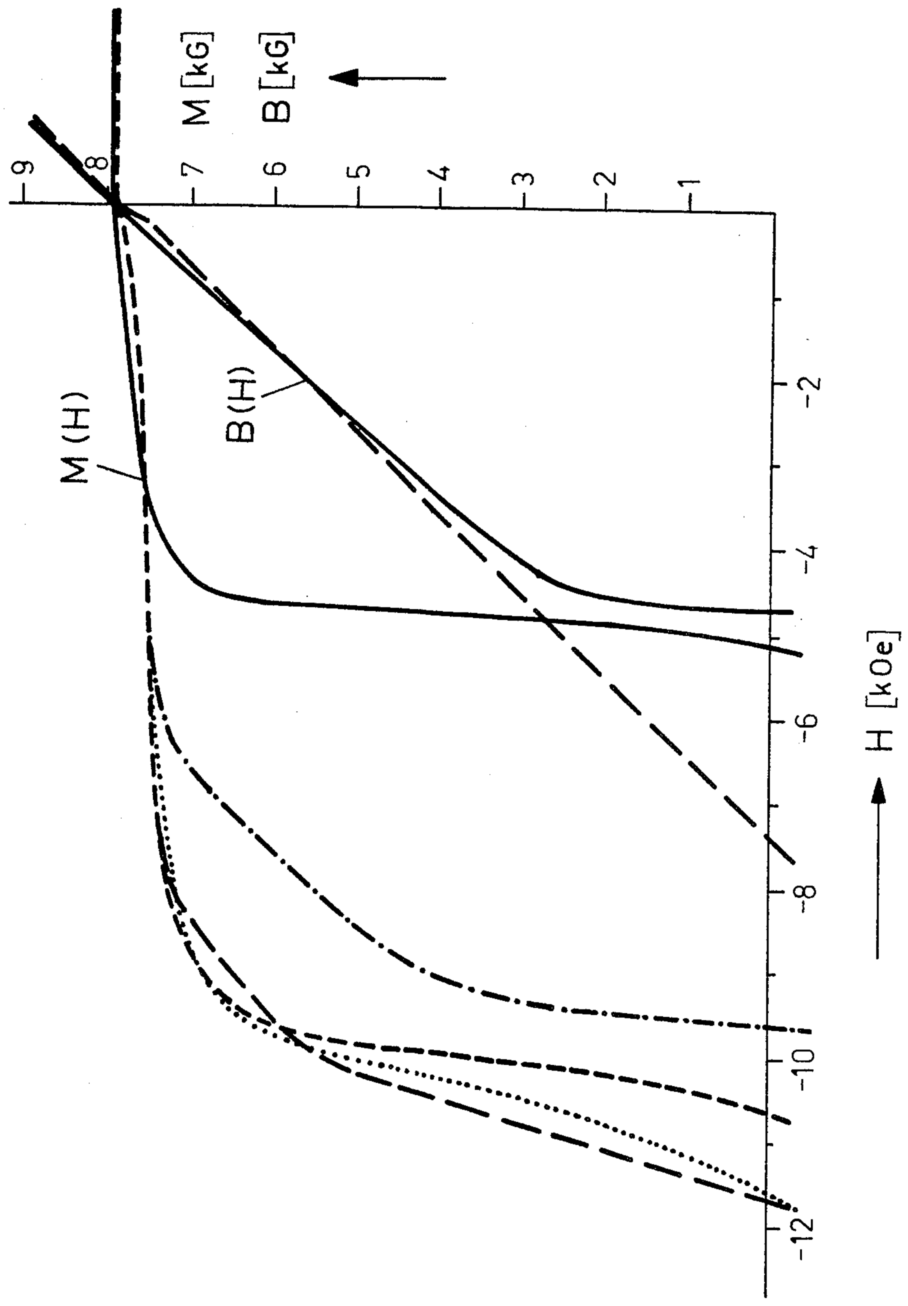
FIG. 7 shows the demagnetizing curves of permanent magnetic material of the composition $CeMM_{0.8}Sm_{0.2}Co_5$, with a mean particle size of about 4 μm after a 20-minute annealing at 980° C, quenching in liquid nitrogen and tempering at about 300°, 350° and 400° C.

Preferred heat-treatment conditions were also determined. The magnetic materials were first annealed between 950° C and 1020° C in subsequent heat-treatments. The annealing times were between 20 minutes and 50 hours. After the annealing operation, the test sample was rapidly cooled, e.g., by liquid quenching, using liquids such as liquid nitrogen, glycerin or other oily organic liquids such as silicone oil. Performing the cooling operation in a cold protective gas atmosphere, such as under argon or nitrogen, has also proved to be very suitable. A further improvement of the magnetic properties can be effected by subsequent tempering-treatment at temperatures of between 300° C and 600° C for 10 to 60 minutes. The resultant improvement of the permanent magnetic properties is illustrated by the demagnetizing curves of a magnet of the composition $CeMM_{0.8}Sm_{0.2}Co_5$ shown in FIG. 7. The continuous lines represent the demagnetizing curves after sintering at $T_s$ = 1040° C. The dash-and-dot line marks the demagnetizing curve after annealing at 980° C and quenching in liquid nitrogen. The demagnetizing curves shown by the fine broken lines, dotted lines and bold broken lines were recorded after additionally tempering at 300° C, 350° C and 400° C, respectively. These results demonstrate that the coercive field strength could be increased by means of annealing and quenching by a factor of 2.25, while a subsequent tempering-treatment effects a further increase in ${}_IH_C$ by 1 - 2 KOe. Also, it appears that an improvement of the permanent magnetic properties by means of the heat-treatment described above is conceivable for any other magnet containing cerium misch-metal/cobalt.

It was shown by further experiments that a temperature of 980° ± 10° C is the optimum for annealing. The increase in the coercive field strength, in this case, is dependent upon the tempering period. In addition to an increase of ${}_IH_C$ of up to 2.5 times its value, an approximation of the demagnetizing curve into a rectangular shape as well as an increase in the remanence $B_R$ are also noticeable if the annealing time is 6 or more hours. Furthermore, it was shown that cooling speed is an extremely critical parameter of the process. Quenching with nitrogen is to be particularly recommended, since it produces considerable increases in the ${}_IH_C$ values and the energy product at annealing times of >6 hours, e.g., in FIG. 7, from 16 to 17 MGOe. In the tempering-treatment, the tempering-temperature and the tempering period are of importance. Optimum improvements of the magnetic properties are attained at a tempering-temperature of 350° C and a tempering period of between 30 and 40 minutes.

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. A magnetic material of the formula $(CeMM_{1-x}Ce_x)_{1-y}Sm_yCo_{5\pm0.2}$, wherein $0.05 < x < 0.25$ and $0 \leqq y \leqq 0.25$ and CeMM is a cerium misch-metal of the formula $Ce_\alpha La_\beta Nd_\gamma Pr_\delta$, wherein $0.45 < \alpha < 0.55$ $0.20 < \beta < 0.40$ $0.05 < \gamma < 0.15$ $0.00 < \delta < 0.05$ and $\alpha + \beta + \gamma + \delta \simeq 1$ wherein the added quantities of Ce added are within the range at which the coercive field strength is increased and less than the quantity at which the coercive field strength deteriorates.

2. The magnetic material of claim 1, wherein $\alpha$, $\beta$, $\gamma$, and $\delta$ are approximately 0.54, 0.30, 0.12 and 0.04, respectively.

3. A magnetic material of the formula $(CeMM_{1-x}La_x)_{1-y}Sm_yCo_{5\pm0.2}$, wherein $0.15 < x < 0.50$ and $0 \leqq y \leqq 0.25$ and CeMM is a cerium misch-metal of the formula $Ce_\alpha La_\beta Nd_\gamma Pr_\delta$, wherein $0.45 < \alpha < 0.55$ $0.20 < \beta < 0.40$ $0.05 < \gamma < 0.15$ $0.00 < \delta < 0.05$ and $\alpha + \beta + \gamma + \delta \simeq 1$ wherein the added quantities of La added are within the range at which the coercive field strength is increased and less than the quantity at which the coercive field strength detoriorates.

4. The magnetic material of claim 3, wherein $\alpha$, $\beta$, $\gamma$, and $\delta$ are approximately 0.54, 0.30, 0.12 and 0.04, respectively.

5. A magnetic material of the formula $(CeMM_{1-x}Nd_x)_{1-y}Sm_yCo_{5\pm0.2}$, wherein $0.05 \leqq x \leqq 0.10$ and $0 \leqq y \leqq 0.25$ and CeMM is a cerium misch-metal of the formula $Ce_\alpha La_\beta Nd_\gamma Pr_\delta$, wherein $0.45 < \alpha < 0.55$ $0.20 < \beta < 0.40$ $0.05 < \gamma < 0.15$ $0.00 < \delta < 0.05$ and $\alpha + \beta + \gamma + \delta \simeq 1$ wherein the quantities of Nd added are within the range at which the coercive field strength is increased and less than the quantity at which the coercive field strength deteriorates.

6. The magnetic material of claim 5, wherein $\alpha$, $\beta$, $\gamma$, and $\delta$ are approximately 0.54, 0.30, 0.12 and 0.04, respectively.

7. A magnetic material of the formula $(CeMM_{1-x}Pr_x)_{1-y}Sm_yCo_{5\pm0.2}$, wherein $0.03 < x < 0.06$ and $0 \leqq y \leqq 0.25$ and CeMM is a cerium misch-metal of the formula $Ce_\alpha La_\beta Nd_\gamma Pr_\delta$, wherein $0.45 < \alpha < 0.55$ $0.20 < \beta < 0.40$ $0.05 < \gamma < 0.15$ $0.00 < \delta < 0.05$ and $\alpha + \beta + \gamma + \delta \simeq 1$ wherein the quantities of Pr added are within the range at which the coercive field strength is increased and less than the quantity at which the coercive field strength deteriorates.

8. The magnetic material of claim 7, wherein $\alpha$, $\beta$, $\gamma$, and $\delta$ are approximately 0.54, 0.30, 0.12 and 0.04, respectively.

9. A process for the production of a permanent magnetic material of the formula:

$(CeMM_{1-x}RE_x)_{1-y}Sm_yCo_{5\pm0.2}$, wherein $0 \leqq y \leqq 0.25$; wherein when RE is Ce, $0.05 < x < 0.25$;

when RE is La, $0.15 < x < 0.50$;

when RE is Nd, $0.05 < x < 0.10$; and when RE is Pr, $0.03 < x < 0.06$; and wherein RE is a rare earth selected from the group consisting of cerium, lanthanum, neodymium and praeodymium, and CeMM is a cerium misch-metal of the formula $Ce_\alpha La_\beta Nd_\gamma Pr_\delta$, wherein $0.45 < \alpha < 0.55$ $0.20 < \beta < 0.40$ $0.05 < \gamma < 0.15$ $0.00 < \delta < 0.05$ and $60 + \beta + \gamma + \delta \simeq 1$, which consists essentially of introducing the starting alloy into a mill in coarsely disintegrated form; grinding it under a protective gas atmosphere to a powder of a particle size of 1 to 10 $\mu$m; admixing the powder formed in a magnetic field; isostatically compressing the resultant powder in to a pressed body; sintering the resultant powder between 1035° C and 1045° C and heat-treating the resultant sintered powder above 300° C.

10. The process of claim 9, wherein the permanent magnetic material is annealed between 950° C and 1020° C for up to 50 hours.

11. The process of claim 9, wherein the permanent magnetic material is annealed at 980° ± 10° C for at least 6 hours.

12. The process of claim 9, wherein the permanent magnetic material is cooled in a liquid of silicone oil, glycerin or liquid nitrogen, or in a protective gas atmosphere of argon or nitrogen.

13. The process of claim 9, wherein the alloy is tempered between 300° C and 600° C for up to 60 minutes.

14. The process of claim 10, wherein the alloy, after tempering, is passed into a zone of lower temperature of about 300° C, and cooled to room temperature after a period of up to 1 hour.

15. The process of claim 9, wherein the starting alloy is fused from $CeMMCo_5$ and $RECo_5$ alloys, wherein RE is Ce, La, Nd or Pr.

16. The process of claim 9, wherein the starting alloy consists of mixed and disintegrated $CeMMCo_5$ and $RECo_5$ alloys, wherein Re is Ce, La, Nd, or Pr.

17. The process of claim 9, wherein the starting alloy, after mixing, is ground with a sintering additive.

18. The process of claim 9, wherein the sintering additive is an alloy containing 50 to 70 % Re and 35 to 50 % Co, wherein Re is Sn, Ce, La, Pr or Nd.

19. The process of claim 13, wherein the alloy is tempered at approximately 350° C for 30 to 40 minutes.

20. The process of claim 9, wherein said magnetic field is approximately 50 KOe.

* * * * *